United States Patent [19]

Burrell

[11] 4,198,367
[45] Apr. 15, 1980

[54] METHOD AND APPARATUS FOR PRODUCING RETREADING ENVELOPES

[76] Inventor: John R. Burrell, 202 King Rd., Chalfont, Pa. 18914

[21] Appl. No.: 901,080

[22] Filed: Apr. 28, 1978

Related U.S. Application Data

[63] Continuation-in-part of Ser. No. 718,792, Aug. 30, 1976, Pat. No. 4,116,605.

[51] Int. Cl.$^2$ ............................................. B29D 23/04
[52] U.S. Cl. ............................. 264/142; 156/110 R; 156/118; 156/122; 264/150; 264/177 R; 264/210.2; 264/292; 425/325; 425/381; 425/466; 425/467
[58] Field of Search ............... 264/210 R, 142, 177 R, 264/150; 425/380, 325, 381, 466–467; 156/122, 118, 110 R

[56] References Cited

U.S. PATENT DOCUMENTS

| | | | |
|---|---|---|---|
| 622,774 | 4/1899 | MacLulich | 264/210 R |
| 1,584,283 | 5/1926 | Fraser | 264/177 R |
| 1,643,999 | 10/1927 | Semple | 264/150 |
| 2,229,885 | 1/1941 | Crisp et al. | 264/177 R |
| 2,423,147 | 7/1947 | Hinman | 264/150 |
| 2,728,104 | 12/1955 | Fisch | 264/210 R |
| 3,273,202 | 9/1966 | Zygan | 264/177 R |
| 3,448,183 | 6/1969 | Chisholm | 264/177 R |

*Primary Examiner*—Jeffery R. Thurlow
*Attorney, Agent, or Firm*—Joseph W. Molasky & Associates

[57] ABSTRACT

A retreading envelope is made by extruding a split tube of rubber which is passed over a rotating stretching wheel to stretch the split tube to a predetermined shape. The stretched split tube is removed from the stretching wheel after moving around a part of the circumference thereof and is turned inside out and placed on a table whereat it is formed and cut into an annular shape preparatory to completion of the retreading envelope.

21 Claims, 8 Drawing Figures

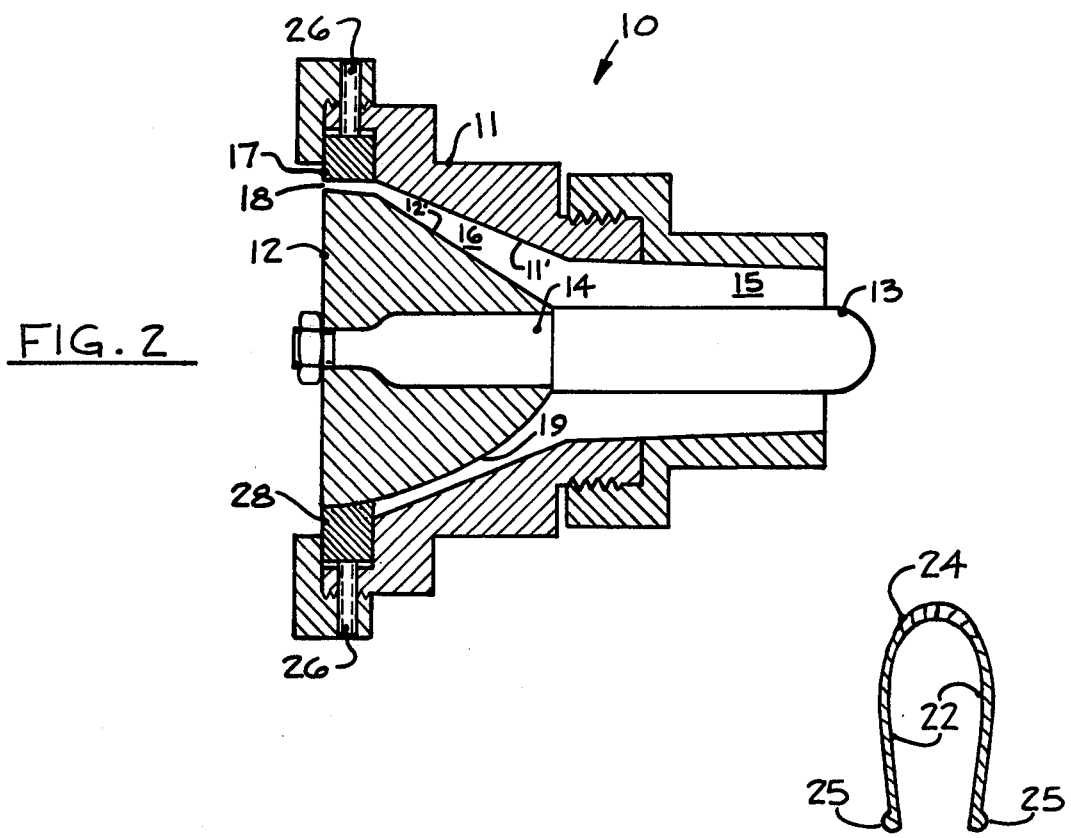
FIG. 2
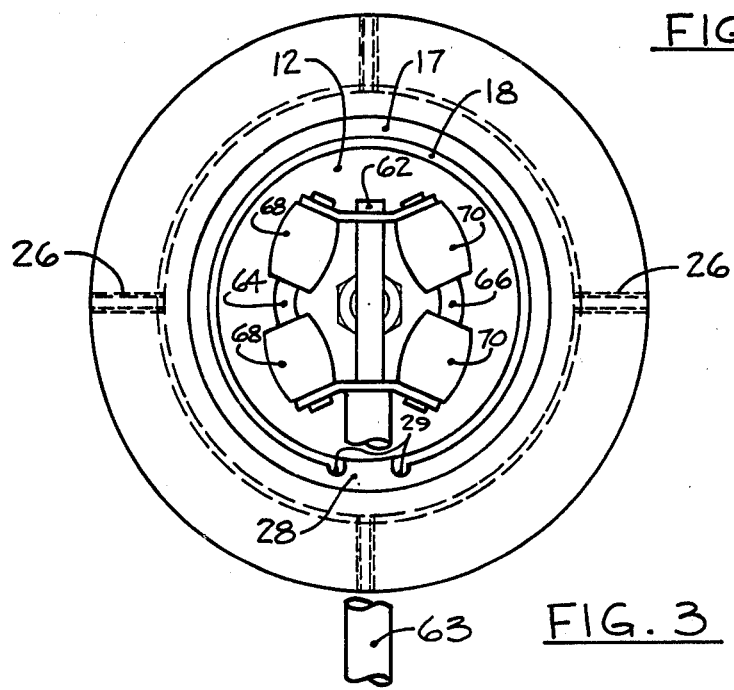
FIG. 4
FIG. 3

METHOD AND APPARATUS FOR PRODUCING RETREADING ENVELOPES

This Application is a continuation-In-part of application Ser. No. 718,792, filed Aug. 30, 1976 now U.S. Pat. No. 4,116,605, issued Sept. 26, 1978.

BACKGROUND

In general, most new tires are made by wrapping a layer of uncured tread rubber around an uncured tire casting and placing the combination in a tire mold where it is subjected to increased temperature and pressure. The result is a "cured" tire in which both the tread and casing are cured simultaneously. This process is effective in making tires because the tread and casing are cured together and only once. However, when these conditions are applied to the retreading of an already cured casing the process does not work nearly as well. The reason for this lies in the properties of once-cured rubber; for while the new tread is being "cured" for the first time, the previously-cured casing is being subjected to a re-curing operation. The result is an over-cured casing whose fibers are severly weakened.

To avoid this problem a second method of recapping tires was developed. According to the method a precured tire tread is wrapped around a precured casing and both elements are bonded together by a "cold" vulcanization process.

In a preferred aspect of this method, an uncured cushion stock of rubber is applied to the casing to secure the tread strip and this combination is encased in an elastic and fluid impervious envelope. The encased tire is then mounted on a rim, inflated to its normal dimensions and placed in a pressure chamber where bonding is effected at temperatures between 212 and 312 degrees Farenheit.

Generally, an outlet valve is provided in the envelope so that entrapped air and moisture from between the tread strip and tire casing can escape to the atmosphere and thus assure a tight cure.

The advantages of using an envelope of this type are several.

First, there is little or no danger of deforming the tire, as in the case when a rigid sealing means is used. And secondly, the elastic envelope will assure retention of the tread material to the tire body during the vulcanization process.

Unfortunately, however, elastic retreading envelopes have a limited life. Although they can be reused so long as they remain intact; nevertheless, and in practice, it commonly occurs that the pulling on and securing of the envelope over the tire carcass, and its subsequent removal, weaken the envelope severely and it develops leaks and eventually fails. Severe wear is also caused as a result of the envelope being drawn down in between the tread lugs. Thus, in retreading processes, the integrity of the envelope is constantly being tested and once it is punctured its effectiveness is destroyed because it can no longer maintain the vacuum which is needed to maintain an effective seal.

In said parent application there is described an improved retreading envelope of such durability that it can be reused repeatedly so as to achieve economies exceeding those of prior envelopes. The retreading envelope of said application comprises a flexible, seamless and fluid impervious envelope of U-shaped cross-section. Also, by utilizing the extruding device described in said application, an envelope can be provided with predetermined thickness along any given portion of its U-shaped cross-section.

THE INVENTION

It is an object of the invention to provide an improved retreading envelope of the indicated type and an improved method and apparatus for making the retreading envelope.

Briefly stated, the retreading envelope of the invention is made by extruding a split tube of rubber which is passed over a rotating stretching wheel for a part of the circumference thereof to stretch the split tube to a predetermined shape. The stretched split tube is removed from the stretching wheel after moving around part of the circumference thereof and is turned inside out and placed on a table whereat it is formed and cut into an annular shape prepatory to completion of the retreading envelope. The apparatus in accordance with the invention for making the retreading envelope comprises an extruder means delivering an envelope forming material in the shape of split ring including a pair of skirts joined by a crown, a stretching wheel means for stretching the material delivered from the extruder means into a predetermined shape, such stretching wheel means including a rotating means, means guiding the material delivered from the extruder means onto the periphery of the rotating means with the crown of the material in contact therewith and a skirt located on each side thereof, and means for driving the rotating means to move about an axis of rotation to cause the material to move around the wheel for a predetermined distance. The improved retreading envelope in accordance with the invention is characterized by the provision of an extruded envelope having enlarged beads at the portion of the skirts forming the center hole edge of the retreading envelope.

A feature of the method and apparatus of the invention is that the extruder can be run continuously so that the rubber material used to make the retreading envelope can be maintained at optimum conditions of temperature, curing, etc.

A feature of the preferred embodiment of the invention is that very high production rates can be achieved as compared with molding procedures or procedures involving the loading and unloading of a stretching wheel. In addition, the size and dimensional stability of the retreading envelope can be maintained very accurately by the method and apparatus in accordance with the invention since the cross-section and diameter of the stretching wheel remains constant for a particular setting.

Another feature of the invention is that the raw material of start-up and shut-down is limited to the beginning and ending of a total days run which is a minimum amount of waste.

Another feature of the invention is that quality control can be maintained easily since the envelope forming material can be checked continuously as the envelopes are accumulated and an accurate and continuous check of the thickness and quantity can be maintained. Variations can be corrected quickly without stopping the apparatus to thereby minimize down time and production losses.

BRIEF DESCRIPTION OF THE DRAWINGS

FIG. 2 is a sectional view of the extruder employed in the apparatus in accordance with the invention;

FIG. 3 is a view taken generally on line 3—3 of FIG. 1 with the envelope forming material omitted for the sake of clarity;

FIG. 4 is a view taken on line 4—4 of FIG. 1 showing the shape of the envelope forming material prior to passing onto the stretching wheel;

DETAILED DESCRIPTION OF THE INVENTION

Figure 1:
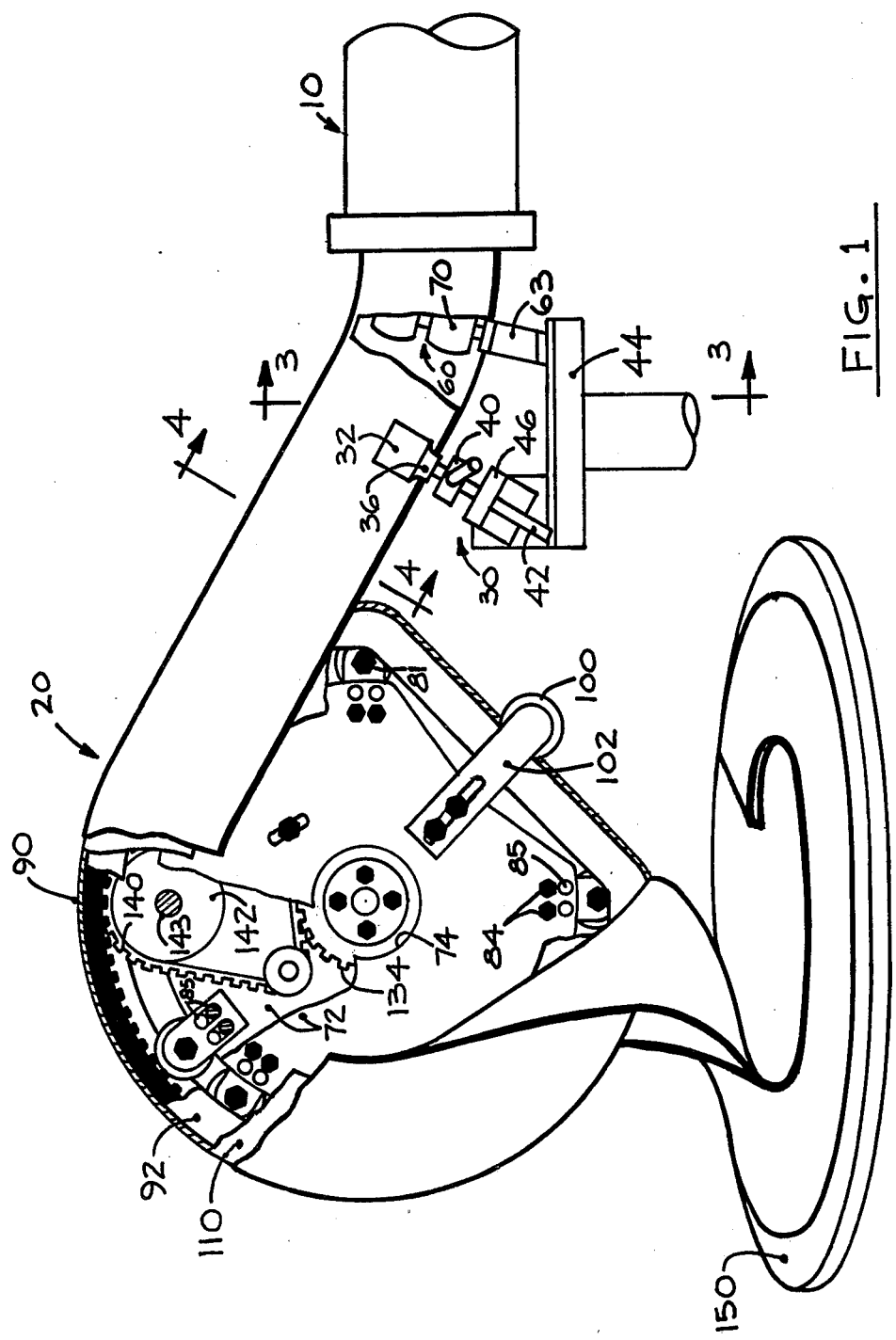
FIG. 1 is an elevational view of apparatus in accordance with the invention.

In my parent application there is disclosed apparatus for making a retreading envelope in accordance with the broadest aspects of the invention.

This apparatus consists of an extrusion device with a ring shaped core or nozzle. The raw material, generally rubber, is fed to this device through an annular chamber which eventually terminates in a toroidal space bounded on the one side by the internal surface of the centrally positioned core and on the other side by the internal surface of the extruded body. The discharge end of the core is bounded by an annular die and, in conjunction therewith, it essentially determines the thickness of the extruded envelope.

Since the object of this device is to produce an envelope whose wall thickness increases as it approaches the sidewalls, it is essential that there be a non-uniform feeding of the raw material through the toroidal chamber. This non-uniformity is achieved by a cambered curvature which covers a portion of the core. This protuberance deflects a portion of the raw material as it proceeds along its path between the extruder body and core and thus accounts for the non-uniform cross section of the resulting envelope.

In the extruding process, described in my parent application, the rubber emerges from the extruder with a variable thickness which is approximately one eighth of an inch at a first position and slightly greater than one sixteenth of an inch at a diametrically opposite second position at which it is automatically cut as it emerges from the extruder. The resulting thickened U-shaped tube is then raised up over a wooden or aluminum stretching wheel which measures 45 inches in diameter and two inches in thickness with a radius of about one inch around the entire periphery of the wheel.

The wheel is motor driven by a variable speed device which allows it to run very slowly as the rubber is emitted from the extruder and placed onto the wheel. As the rubber is taken over the top of the wheel (which is approximately two feet above the extruder) the rubber is grasped by the wheel and stretched to the desired configuration.

In accordance with said parent application, the stretched rubber is allowed to accumulate on the wheel until approximately five or six bags have been built; then the extruder is turned off, the wheel is stopped, the rubber is cut and cooled and it is then peeled off the said wheel and coiled onto a flat table in circular form. Thereafter, the rubber is inspected and positioned to afford the desired diameter so as to accommodate the curing mold. A splice is made using a skiving machine, so that the bag can be placed into the mold.

Next, a curing ring is placed in the center of the bag so that it can become an air container and allow air to be blown into it during the curing process. The entire unit, that is, the bag plus the curing ring, are then placed in the mold and said mold is closed and the bag is inflated to approximately 100 pounds of pressure. This assembly is then allowed to cure for about 15 minutes. After curing, the curing ring is removed and the center of the bag is die cut with a clicking machine to afford the desired diameter at the center hole. A second method of curing is to place a stretching ring inside the outer circumference of the bag and to cure by placing in an autoclave at a temperature of about 310° F. for about one hour.

A second modification of the stretching wheel described in my parent application is designed with the same diameter of 45 inches and the same cross section of two inches with a radius of one inch at the outer circumference, but instead of being a single wheel, it is in the shape of a continuous wheel similar to a thread on a bolt. The depth of the wheel is sufficient to provide an ample area for the rubber to be stretched down completely over its sides. In addition, it is long enough in width to accommodate seven to eight bags before it is full. Under this variation the bag or rubber is never on top of itself and always has direct contact with the wheel and any given portion of the rubber. The advantage of this is that the rubber can be water cooled and set in its desired shape much quicker. An additional advantage is that several wheels can be employed and can be moved in front of the extruder and changes more quickly, thus, allowing for a more highly automated production process.

The preferred form of the invention is shown in FIGS. 1 to 8 and will be described with reference thereto. Referring to FIG. 1 there is shown an extruder means 10 constructed and arranged to deliver an envelope forming material, such as a suitable rubber, in the shape of a split ring including a pair of skirts joined by a crown, to a stretching wheel means 20 constructed and arranged for stretching material delivered from extruder means 10 into a predetermined shape for making a retreading envelope.

As shown in FIG. 2, extruder means 10 is similar to the extruder shown in my parent application and comprises an extruder body 11, a core 12 and a spider 13 disposed along the longitudinal axis of extruder body 11 and connected to core 12 by a threaded longitudinally extending rod 14. The raw material (a suitable rubber) is fed into extruder means 10 by an inlet tube (not shown) which delivers the material to an annular chamber 15. The raw material then passes from chamber 15 into a chamber 16 bounded by the internal surface 11' of extruder body 11 and the external surface 12' of core 12. A die ring 17 extending around core 12 is mounted for adjustable movement transversely with respect to the longitudinal axis of extruder body 11 by means of four adjusting screws 26 circumferentially equally spaced around die ring 17. Case 12 and die ring 17 define therebetween a generally annular discharge orifice 18 for extruder means 10. Orifice 18 determines the cross-section of the extruded split ring.

As is described in my parent application the size of the discharge opening 18 in conjunction with the provision of a cambered curvature 19 on core 12 serves to produce an envelope forming material of an extruded cross-section characterized by a greater concentration of material along its middle or crown portion, which portion ultimately serves as the tread zone. As will be described hereafter, the material fed from extruder means 10 is placed on a rotating means of stretching wheel means 20 with the center or heavier crown portion being stretched around the circumference of the rotating means so as to shape it to the desired form of the retread envelope. This shaping is achieved in approximately 90 degrees of travel around the rotating means. As will appear hereafter the edges of the skirts of the extruded stock become the inner limits of the envelope and are not stretched.

In accordance with the preferred form of the invention, extruder means 10 is constructed to deliver an envelope forming material in the shape of a split ring split at the bottom and including a pair of side skirts 22 with a crown 24 therebetween. The split ring has a circular cross-section like orifice 18 (see FIG. 3) as it emerges from extruder means 10 and collapses to a U-shaped cross-section (see FIG. 4) as it approaches stretching wheel means 20. To this end, extruder means 10 is provided with a bridge 28 extending between die ring 17 and core 12 to form a closed region of the extruder orifice 18. By this arrangement the material discharged from extruder means 10 is in the form of a split ring and there is no need to provide a special cutter for cutting the extruded material before it passes to the stretching wheel means 20. Bridge 28 is formed by a portion of die ring 17 projecting radially inwardly form the inner orifice defining portion of die ring 17 as is shown in FIG. 3. Die ring 17 is also provided with recesses 29 on each side of the bridge 28, said recesses 29 being constructed and arranged to form enlarged beads 25 on the extruded material passing from extruder orifice 18. These beads 25 serve to provide several advantages in the method and apparatus in accordance with the invention and in the final envelope formed as a result thereof, which advantages will be described hereafter.

Means are provided for guiding the material delivered from extruder means 10 onto the periphery of the rotating means for stretching wheel means 20 with its crown 24 in contact with the rotating means and a skirt 22 located on each side thereof. To this end, there is provided a skirt roller assembly 30, shown in FIG. 5, cooperating with each skirt 22 of the split tube in the region adjacent to the beads 25 thereof to hold each skirt 22 at a predetermined position relative to the stretching wheel rotating means. As is shown in FIG. 1, skirt roller assemblies 30 are located between extruder means 10 and stretching wheel means 20.

Figure 5:
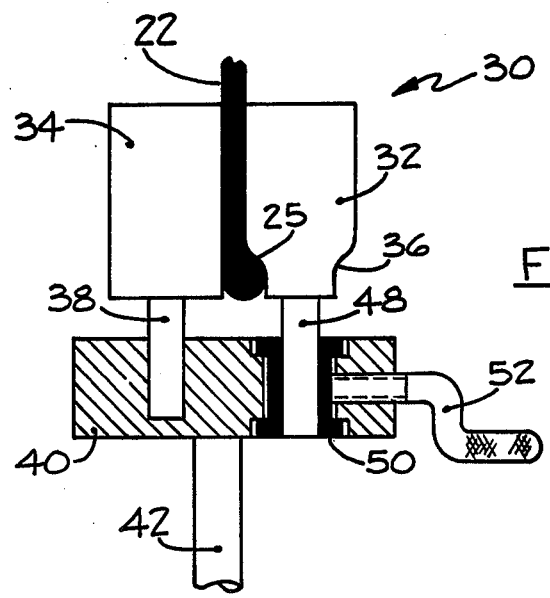
FIG. 5 is a detail view showing the skirt roller assembly.

As shown in FIG. 5, each skirt roller assembly 30 comprises a cylindrical skirt roller 32 having a reduced diameter portion 36 and a cylindrical skirt roller 34. Reduced diameter portion 36 of skirt roller 32 provides a recess adapted to receive a bead 25 so that the adjacent skirt 22 is secured between skirt rollers 32 and 34 and held against upward movement. Roller 34 is rotatably mounted on a cylindrical mounting bar 38 carried by a support plate 40 supported on the end by a mounting bar 42. Mounting bar 42 is adjustably mounted on a support 44 by a mounting assembly 46. Roller 32 is rotatably mounted on a cylindrical mounting bar 48 secured in a sleeve 50 mounted in mounting plate 40 so that mounting bars 38 and 48 extend parallel to one another upwardly from support plate 40. Sleeve 50 is mounted to be adjustable toward and away from mounting bar 38 to vary the spacing between the parallel mounting bar 38 to vary the spacing between the parallel mounting bars 38 and 48 as is shown in FIG. 5. A screw member 52 is threadedly mounted in support plate 40 to cooperate with sleeve 50 to position same.

Each of the skirt roller assemblies 30 as constructed and arranged to be set to engage a skirt 22 at its bead 25 to hold the same against upward movement while permitting the skirt to pass between the cooperating rollers 32 and 34.

The means for guiding the material from extruder means 10 to stretching wheel means 20 also comprises an inner support roller assembly 60 located between extruder means 10 and the skirt roller assemblies 30. Support roller assembly 60 comprises a mounting bracket 62 carried on support 44 by a mounting assembly 63. Mounting bracket 62 supports a pair of bent cylindrical rods 64 and 66. Rod 64 has a pair of support rollers 68 rotatably mounted thereon and rod 66 has a pair of support rollers 70 rotatably mounted thereon. Rods 64 and 66 are arranged to rotatably support rollers 68 and 70 in an arrangment to contract the inside wall of the split tube of material passing from the extruded orifice 18 and is spaced a short distance from orifice 18 and to maintain the skirts 22 of the split tube of material in a spaced apart relation as the material passes to skirt rollers assemblies 30. Support roller assembly 60 thus serves to prevent contact between the skirts 22 so as to prevent them from sticking together while in the elevated temperature condition that exists at the discharge of extruder means 10.

As shown in FIG. 1, the top portion of stretching wheel means 20 (about which the material being stretched passes) is above extruder means 10 and skirt roller assemblies 30. Typically, the top of stretching wheel means 20 is about two feet above the top portion of extruder orifice 18. This spacing determines the amount of stretching applied to the envelope forming material since, as will be described more fully hereafter, the crown 24 of the split ring material is fed around the top of stretching wheel means 20 while the skirts 22 thereof are held down by skirt roller assemblies 30 engaging the beads 25 thereof.

Figure 6:
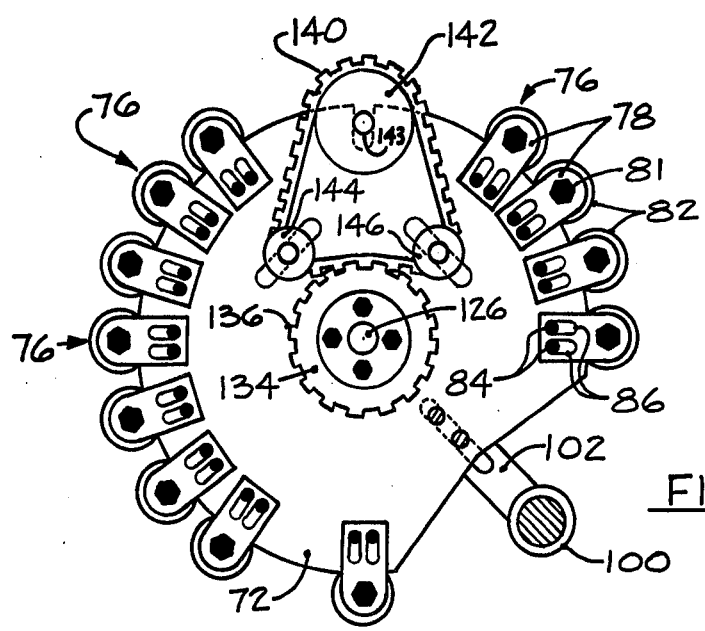
FIG. 6 is a detail view showing elements of the stretching wheel.
Figure 7:
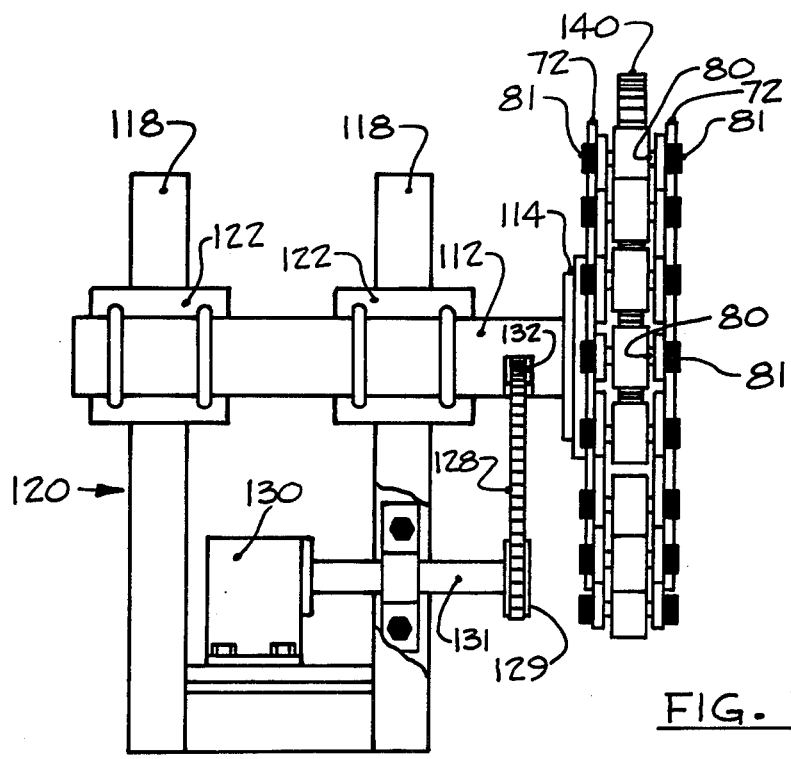
FIG. 7 is a detail view showing the drive means for the stretching wheel.

Stretching wheel means 20 comprises a frame including a pair of spaced side frame members 72 in the form of plates having a circular center opening 74. As is shown in FIGS. 1 and 6, the periphery of each frame member 72 comprises a circular portion (about three-quarters of the circumference). There are provided twelve idler assemblies 76 spaced circumferentially around the circular portion of frame members 72. Each idler assembly 76 comprises a pair of plates 78 carrying a spacer 80 extending between the plates 78 to maintain the same in a spaced apart relation. A pair of plates 78 are mounted on each spacer 80 by nuts 81 which threadedly engage each threaded end of a spacer 80. An idler pulley 82 is journalled on each spacer 80 in a manner that spacer 80 serves as an axle therefor. The threaded ends of spacer 80 have a smaller diameter than the central portion thereof to form shoulders which are contacted by plates 78 as nuts 81 are tightened onto the spacer ends.

Each idler assembly 76 is mounted on frame members 72 so as to be adjustable radially on the axis passing through the centers of frame members 72 as is shown in FIG. 6. To this end, each pair of plates 78 is secured in a set position by a pair of bolt means 84 which extend through holes 85 in frame members 72 and slots 86 in plates 78. The parts are constructed and arranged so that the idler assemblies 72 can be set at different radial positions by sliding plates 78 on the bolt means 84 and tightening the bolt means 84 when a desired setting is achieved. Bolt means 84 can be placed to extend through either of two pairs of radially spaced holes 85 to increase the range of radial adjustment of idler assemblies 76.

Figure 8:
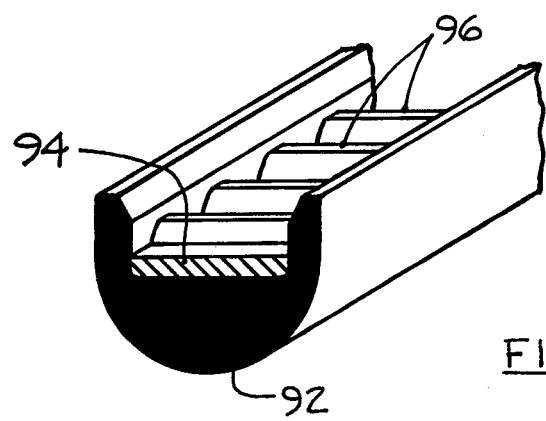
FIG. 8 is a view of a detail.

Stretching wheel means 20 comprises a rotating means 90 including a tire-like belt 92 made of extruded rubber. Belt 92 is constructed as an enclosed loop having a rounded outer rim and a timing belt 94 vulcanized on the inner rim thereof as shown in FIG. 8. Timing belt 94 is mounted on belt 92 with the teeth 96 thereof facing radially inwardly.

The twelve idler roll assemblies 76 provide means for supporting belt 92 on frame members 72 in an generally circular configuration and for guiding belt 92 for movement around the central axis of frame members 72. To this end, the parts are arranged so that the teeth 96 on the inner rim of timing belt 94 ride on rollers 82 of idler roll assemblies 76. Belt 92 and timing belt 94 are flexible so as to be positioned in the circular configuration necessary to contact rollers 82. The portion of belt 92 extending across the cutaway portion of frame members 72 is contacted by a dogbone type of roller 100 rotatably mounted on a bracket assembly 102 which is mounted on frame member 72 so as to be adjustable radially whereby roller 100 can be adjusted to contact the outer rim of belt 92 to take up any slack therein.

The radial setting of roller assemblies 76 determines the shape of belt 92 and the dimensions of the radius of curvature of the periphery of belt 82 in the region adjacent the circular portion of frame members 72. The dogbone roller 100 is set radially to take up any slack in the straight return portion of belt 92.

Rotating means 90 of stretching wheel means 20 also includes an annular flexible tube 110 covering stretching wheel belt 92 and arranged to be in direct contact with the envelope forming material passing around the periphery of belt 92. The sides of tube 110 extend to cover the idler roll assemblies 76. Tube 110, which can be made from a tire inner tube having its center cut out, acts as a protective shroud for belt 92 by preventing direct contact between the envelope forming material and belt 92. Such contact could cause damage to belt 92 by reason of the elevated temperature of the envelope forming material passing from extruder means 10.

The entire assembly of parts forming stretching wheel means 20 are supported on the end of a horizontally extending drive shaft tube 112 by means of a mounting plate assembly 114 secured between shaft 112 and frame members 72. Frame members 72 are supported on drive shaft tube 112 to extend generally in a vertical plane with the horizontal center axis of frame member 72 being approximately aligned with the longitudinal axis of drive shaft tube 112. Drive shaft tube 112 is mounted on a pair of uprights 118 of a stand 120 by means of a pair of mounting bracket assemblies 122. Bracket assemblies 122 are adjustable vertically on uprights 118 so that drive shaft tube 112 can be adjusted in a vertical direction to a desired elevated position. By this arrangement, stretching wheel means 20 is adjustable vertically relative to extruder means 10 and skirt roller assemblies 30 so as to determine the amount of stretching that is applied to the envelope forming material passing from extruder 10.

Extending horizontally within drive shaft tube 112 is the stretching wheel drive shaft 126 arranged to be driven by a chain drive means including a chain 128 driven by a motor drive assembly 130 mounted on stand 120. Chain 128 engages a gear 132 mounted on drive shaft 126 and a gear 129 on a shaft 131 driven by motor drive assembly 130. Drive shaft 126 extends through drive shaft tube 112 into the interior of stretching wheel means 20 and carries on its extended end a drive pulley 134 for stretching wheel means 20. Drive pulley 134 is a toothed gear pulley having teeth 136 on its periphery.

A drive belt 140 having teeth on its external side is arranged to engage teeth 136 on drive pulley 134. To this end, drive belt 140 is arranged to pass around an idler wheel 142 mounted on the top portion of frame members 72 and a pair of idler pulleys 144 and 146 located adjacent to pulley 134. Idler wheel 142 and pulleys 144 and 146 are arranged to maintain the belt 140 with its teeth in engagement with teeth 136 of drive pulley 134 and, as best shown in FIG. 1, with the teeth 96 of rotating means 90. By this arrangement, as drive pulley 134 is caused to rotate in the clockwise direction as viewed in FIG. 1, belt 92 and tube 110 carried thereby are caused to rotate in a counterclockwise direction. The shaft 143 of idler wheel 142 is adjustable vertically on frame memers 72 by suitable means to insure that drive belt 140 is positioned to engage teeth 96 of belt 92.

Motor drive assembly 130 is a variable torque drive constructed to drive shaft 126 through chain 128 at a speed such that drive pulley 134 and belt 140 cause rotation of belt 92 at a slow speed so as to achieve the stretching of the envelope forming material as desired. To this end, motor drive assembly 130 includes an electric motor, reduction gearing and an electronic slip clutch that allows various torque settings. The setting of the slip clutch is such that there is delivered an optimum stretching torque to the belt 92 as determined by the operator of the apparatus. For any given material the nature of rubber and the temperature thereof determines an optimum torque setting for the rotating means 90 of stretching wheel means 20. Typically, the operation is on the basis of foot pounds of torque which is achieved by the setting of the variable torque drive.

In the operation of the apparatus in accordance with the invention the envelope forming material is discharged from extruder means 10 in a split ring configuration as determined by the shape of orifice 18. The split ring is maintained with its side skirts 22 in a separated condition by support roller assembly 60 as it passes into the grip of the skirt roller assemblies 30 which engage the skirts 22 at the beads 25 thereof as was described above. From the skirt roller assemblies 30, the envelope forming material passes upwardly and around the top of the rotating means 90 of stretching wheel means 20. As the split ring is taken over the top of belt 92, the crown 24 thereof is approximately two feet above the top of orifice 18 of extruder means 10. The crown 24 is grapsed by the belt 92 and is stretched as it moves around the circular portion thereof. The stretching action is achieved in about the ninety degrees of rotative movement around the stretching wheel means 20. The split ring continues to move around the stretching wheel means 20 for about another ninety or more degrees of movement through a region that may be termed a holding quadrant. The split ring of envelope forming material is peeled from belt 92 at the bottom of the rotating means 90 of stretching wheel means 20 as is shown from FIG. 1. The split tube of material removed from stretching wheel means 20 is turned inside out and delivered onto a horizontal table 150 in a flat condition. The flat tube delivered onto table 150 is placed in an annular configuration and cut into a circumferential length for forming a single retreading envelope. The flat tube is cut after there is deposited on table 150 a sufficient length of material to make one envelope only and care is taken to avoid overlapping of the flat envelope forming tube. Such overlapping can cause wrinkles to be formed on the envelope forming tube. After the material is inspected, it is delivered to a work station whereat a splice is made by the use of a skiving machine to complete the envelope prior to vulcanization. The remainder of the envelope forming procedure is described in said parent application.

What is claimed is:

1. In an apparatus for producing a retreading envelope for tires, extruder means delivering an envelope forming material in the shape of a split ring including a pair of skirts with a crown therebetween, said extruder means including a die ring, a core positioned within said die ring and cooperating therewith to define a generally annular extruder orifice, a stretching wheel means for stretching the material delivered from said extruder means into a predetermined shape, said stretching wheel means including a rotating means, means guiding the material delivered from said extruder means onto the periphery of said rotating means with the crown in contact therewith and a skirt located on each side thereof, said guiding means including a plurality of roller means engaging each skirt of said split tube to hold said skirts at a predetermined position relative to said stretching wheel and to maintain said skirts in spaced apart relation as said stretching means stretches the material delivered thereto, and means for driving said rotating means to move about an axis of rotation to cause said material to move around said axis for a predetermined distance.

2. Apparatus according to claim 1 wherein said rotating means is constructed and arranged so that the stretched material is peeled from the periphery thereof after movement partly therearound for forming the stretched material into a retreading envelope.

3. Apparatus according to claim 1 wherein said extruder means is constructed to form the ends of said skirts of said split ring with enlarged beads which form the center hole edge of the retreading envelope.

4. Apparatus according to claim 3 wherein said extruder means includes a bridge extending between said die ring and said core to form a closed region of sad orifice, said enlarged beads being formed by recesses in said die ring located adjacent to said bridge.

5. Apparatus according to claim 3 wherein said roller means of said guiding means comprises a pair of skirt rollers cooperating with each skirt of said split tube in the region adjacent to said beads to hold said skirts at a predetermined position relative to said stretching wheel rotating means, each of said skirt rollers being located between said extruder means and said stretching wheel rotating means and below the top portion of said stretching wheel rotating means.

6. Apparatus according to claim 5 wherein one of each pair of skirt rollers has a reduced diameter portion adapted to receive an enlarged beaded edge, and the other of each pair of skirt rollers is cylindrical.

7. Apparatus according to claim 5 wherein said roller means of said guiding means comprises an inner support roller assembly located between said extruder means and said skirt rollers and including a plurality of rollers arranged to contact the inner sides of said skirts to maintain said skirts in a spaced apart relation as they pass to said skirt rollers.

8. Apparatus according to claim 5 including means for adjusting said stretching wheel means vertically relative to said skirt rollers and said extruder means to adjust the periphery of said rotating means to a predetermined height thereabove.

9. Apparatus according to claim 2 wherein said rotating means comprises a tire-like belt forming an enclosed loop and having a rounded rim, and said stretching wheel means comprises a frame, and means supporting said belt on said frame in a generally circular configuration and guiding the same for movement around said axis of rotation.

10. Apparatus according to claim 9 wherein said belt is made of a flexible material and said belt supporting means comprises a plurality of rollers spaced circumferentially around a substantial extent of said frame and arranged to contact the inner rim of said belt to determine the shape of said belt as it moves around said axis or rotation.

11. Apparatus according to claim 10 including means for adjusting said rollers radially of said axis of rotation to change the shape of said belt.

12. Apparatus according to claim 11 wherein said rollers are arranged to support said belt in a circular configuration throughout only a portion of its circumferential extent and to provide a generally straight return portion of said belt between the ends of said circular portion.

13. Apparatus according to claim 12 including an idler roller means positioned to contact said return portion of said belt to take up slack therein.

14. Apparatus according to claim 13 wherein the circumferential extent of said circular portion of said stretching wheel belt is approximately three-fourths of the circumference thereof and includes the top portion of the stretching wheel.

15. Apparatus according to claim 14 wherein said extruded material is moved around the circular portion of said stretching wheel belt for a circumferential extent of greater than about one-half and less than about three-fourths of the circumference of said stretching wheel belt before being peeled therefrom.

16. Apparatus according to claim 10 wherein said stretching wheel rotating means includes an annular flexible tube covering said stretching wheel belt arranged to be in direct contact with the extruded material passing around the periphery of said belt.

17. Apparatus according to claim 10 wherein said belt comprises an inner rim constructed to provide gear teeth facing radially inwardly, said driving means for said stretching wheel rotating means comprising and endless drive belt having gear teeth on the outer side thereof, and mans supporting said endless drive belt on said frame within said stretching wheel belt for endless movement with said teeth thereof in driving engagement with the gear teeth of said stretching wheel belt.

18. Apparatus according to claim 17 wherein said drive means for stretching wheel rotating means comprises a drive pulley mounted on said frame for rotating about said axis of rotation, said support for said endless drive belt including a pair of idler pulleys holding said endless drive belt in driving engagement with said drive pulley, and an idler wheel holding said endless drive belt in driving engagement with said stretching wheel belt.

19. In a method of producing a retreading envelope for tires the steps of:
   forming a split tube of material to be formed into a retreading envelope, said split tube having a pair of side skirts with a crown therebetween
   delivering the split tube onto the periphery of a rotating stretching wheel so that the material is stretched into a predetermined shape,
   maintaining the side skirts in a separated condition and holding said side skirts at a predetermined position relative to said stretching wheel while the crown is delivered and stretched over said rotating stretching wheel,
   removing the stretched split tube of material from the stretching wheel after it is moved partly around the circumference thereof, and
   forming the removed split tube into an annular shape for use as a retreading envelope.

20. The method of claim 19 wherein the split tube removed from the stretching wheel is turned inside out and delivered horizontally onto a table.

21. The method of claim 20 wherein said turned tube delivered onto the table is placed into an annular configuration and cut into a circumferential length for forming into a single retreading envelope.

* * * * *